(12) United States Patent
Vance et al.

(10) Patent No.: US 6,411,605 B1
(45) Date of Patent: Jun. 25, 2002

(54) SCHEDULER FOR TELECOMMUNICATIONS BRIDGE

(75) Inventors: Joseph E. Vance, West St. Paul, MN (US); Ruth A. Cameron, Golden, CO (US)

(73) Assignee: Qwest Communications International, Inc., Denver, CO (US)

( * ) Notice: Subject to any disclaimer, the term of this patent is extended or adjusted under 35 U.S.C. 154(b) by 0 days.

(21) Appl. No.: 09/112,244

(22) Filed: Jul. 8, 1998

(51) Int. Cl.$^7$ .............................................. H04L 12/16
(52) U.S. Cl. ..................... 370/261; 370/356; 370/395.4
(58) Field of Search ................................. 370/259, 260, 370/261, 262, 263, 264, 352, 353, 354, 355, 356, 401, 395.4, 395.41, 395.42, 395.43, 465, 468; 379/201, 202, 203, 204, 205, 206, 207, 88.17

(56) References Cited

U.S. PATENT DOCUMENTS

| | | | |
|---|---|---|---|
| 4,460,807 A | | 7/1984 | Kerr et al. ..................... 179/18 |
| 4,475,189 A | | 10/1984 | Herr et al. ..................... 370/62 |
| 4,577,065 A | | 3/1986 | Frey et al. ..................... 179/18 |
| 5,546,449 A | | 8/1996 | Hogan et al. ................ 379/202 |
| 5,631,904 A | | 5/1997 | Fitser et al. ................. 370/261 |
| 5,909,431 A | * | 6/1999 | Kuthyar et al. ............. 370/260 |
| 5,916,302 A | * | 6/1999 | Dunn et al. .................. 709/204 |
| 5,995,608 A | * | 11/1999 | Detampel, Jr. et al. ..... 379/205 |
| 6,049,602 A | * | 4/2000 | Foladare et al. ............ 379/265 |
| 6,081,513 A | * | 6/2000 | Roy ............................. 370/260 |
| 6,105,055 A | * | 8/2000 | Pizano et al. ............... 709/204 |

* cited by examiner

*Primary Examiner*—Kwang Bin Yao
(74) *Attorney, Agent, or Firm*—Marsh, Fischmann & Breyfogle LLP (57) ABSTRACT

The scheduling system (10) includes a bridge administrator (12) that is interfaced with a plurality of nodes (14, 16 and 18) via a public network such as the Internet (24). In the illustrated embodiment, each of the nodes (14, 16 and 18) includes both a phone (14A, 16A and 18A) and a computer (14B, 16B and 18B). The bridge administrator (12) includes a scheduler (26), a controller (28), a user database (30), a scheduling database (32) and a number of bridges (34, 36 and 38). A user can access the scheduler (26) via the Internet in order to schedule a conference call using one of the bridges (34, 36 and 38). The scheduler (26) authenticates the user based on the user database (30) and determines bridge availability based on the scheduling database (32). Scheduling information is then reported to the user and other conference call participants. At the scheduled conference call time, each of the conference call participants can access the selected bridge(s) (34, 36 and/or 38) in order to be patched into the-conference call. The invention thereby automates bridge scheduling so as to allow for better bridge utilization without requiring manual administration.

15 Claims, 7 Drawing Sheets

Netscape- [Conference Call Schedule]
File Edit View Go Bookmarks Options Directory Window Help Netsite: http://whistler:8139/cgi-bin/con/call_page2.pl Time Of Call [5 PM] [00]  Time Zone [Mountain]

Duration of Call: [60 minutes]

Number of Conference Attendees: [Less Than 30]

Primary Area Code (area code of most callers): [NA]

Repeating Meeting? ⊙ This date only  ○ Daily  ○ Weekly  ○ Monthly

Pick Own Number?  ⊙ No   ○ Yes

Description [         ]

FIG.6

Netscape- [Conference Call Schedule]
File Edit View Go Bookmarks Options Directory Window Help Netsite: http://whistler:8139/cgi-bin/con/call_new.pl Daily Conference Call Date Of Call: 8/27/1997

Time Of Call: 12PM:00

Duration of Call: 30 minutes

Description:

Daily Meeting On?  ☐ Monday ☐ Tuesday ☐ Wednesday ☑ Thursday ☐ Friday

[Schedule Call]

SCHEDULER FOR TELECOMMUNICATIONS BRIDGE

FIELD OF THE INVENTION

The present invention relates in general to administering access to shared resources such as bridge hardware for establishing conference calls in a telecommunications network and, in particular, to a scheduler that can be accessed by users via a communications network such as the Internet to schedule conference calls.

BACKGROUND OF THE INVENTION

Conference calls between three or more participants are generally either established unilaterally by a host participant or multilaterally using bridge hardware. In the first case, the host participant typically sequentially calls the phone numbers for each participant and patches the connections for each participant together one-by-one using a conference feature provided in connection with the host participant's telephone. In the latter case, each participant is connected to a port of a bridge system. Such bridge hardware may be privately or publicly operated. Using such bridge hardware is preferred for many applications because it eliminates the need for a host participant to dial telephone numbers for all participants, saves time and improves connection quality, particularly for large conference calls.

Access to bridge hardware must be controlled in order to ensure adequate availability. In the simplest case, particular bridge hardware (one or more bridges) may be dedicated to a particular group, e.g., a development team located in one or more facilities of a corporation or other organization. At a prearranged time, the conference call participants dial into a dedicated bridge number and, if a bridge is available, are connected to establish the conference call. While this arrangement is satisfactory for some applications, it generally results in underutilization of bridge resources, i.e., a large number of bridges may be required in order to ensure adequate availability. For example, bridges administrated in this manner may be utilized only ten percent or less of the time. Because bridge hardware can be expensive, bridge systems administered in this manner can require a substantial up-front investment to acquire the necessary amount of bridge hardware.

To improve utilization and reduce up-front costs, it is desirable to schedule access to a pool of bridges. Typically, such scheduling has been done manually. In this regard, at least one conference participant generally calls an operator who manages the bridge hardware with information regarding a proposed conference call. Such information may include, for example, the date and time of the proposed conference call, the anticipated duration of the call, the number of participants and the identity of the participants. Based on this information, the operator determines what bridge resources will be required, consults a database to identify available resources, and if resources are available, schedules the conference call. Depending upon the particular system, the operator may then give the arranging participant or all participants a telephone number for dialing-in to access the bridge at the arranged conference call time. Alternatively, the various participants may be called to initiate the conference call. In either case, the participants are each connected to a port of a bridge or bridges in order to patch together the conference call.

Although such scheduling allows for greater bridge utilization and reduced costs, it is problematic for certain applications. Some large organizations may have a large number of privately operated bridges, for example, several hundred bridges. Manual administration of such bridges could require the full time attention of a number of employees thus increasing system overhead. Such administrative overhead is even greater for publicly accessible bridge resources, i.e., bridge resources made available to clients by a telecommunications company. As a result, in order to ensure adequate access to bridge resources, it is often necessary to either make a substantial up-front investment to create an oversupply of bridge resources that will be underutilized, or to bear substantial on-going administrative expenditures in order to more fully utilize a smaller supply of bridge resources.

SUMMARY OF THE INVENTION

The present invention is directed to a system for automatically administering shared resources telecommunications bridge resources. The system allows a pool of bridges, and associated bridge numbers, to be automatically assigned to prospective conference call participants based on accessing a scheduler via a computer network. The invention thus allows for better utilization of bridge resources than would be obtained using dedicated, rather than pooled, hardware, thereby reducing up-front hardware requirements. Moreover, such improved utilization is achieved without manual administration thereby reducing ongoing administrative overhead. The invention can be used to schedule access to other types of shared resources such as conference rooms.

According to one aspect of the present invention, the scheduler, which may be embodied in software or other logic running on a network platform, receives requests from network users via a computer network such as the Internet. The corresponding method is initiated by providing a scheduler for use in scheduling access to shared resources such as bridge hardware, interfacing the scheduler with the public computer network (e.g., by establishing a URL and activating the associated website), and receiving an access request via the public network from a first user node associated with a first network user, e.g., the arranging conference call participant.. The access request, which requests access to the scheduler to schedule a conference call, preferably includes an ID code or other identification information regarding the network user. The scheduling method further includes the steps of authenticating the access request by verifying the identification information, selectively allowing the user to access the scheduler based on such authentication, receiving a scheduling request, from the network user via the network, using the scheduler to access a scheduling database and process the scheduling request and outputting scheduling information regarding the shared resource to the network user based on the process scheduling request.

In the case of a conference call bridge scheduler, the scheduling request may include, among other things, the date and time of the prospective conference call, the anticipated duration of the conference call, and the number and identity of the conference call participants. In order to facilitate the entry of a list of conference call participants, the scheduler may import data from other programs, such as electronic address books including group fields, to populate the fields associated with the call participants. Based on this information, the scheduler can determine the amount of bridging resources that will be required to service the conference call (e.g., the number of bridges) and the availability of such resources at the requested time. If the resources are available, the scheduler reserves the resources by communicating with a control system associated with of the bridge resources, data base or operator and, optionally reports the corresponding access information to the prospective conference call participants. For example, the access information may include a 1-800 number for dialing-in to access the bridge resources at the time of the conference call. If the resources are not available, the scheduler and network user can interactively determine an alternative time for the conference call. The participation of conference call participants can be confirmed via communications between such participants and the scheduler via the public network. For example, the participants may access the scheduler to confirm their participation. Alternatively, the scheduler may contact the participants identified in the original scheduling request to obtain confirmation and provide access information. At the selected time for the conference call, the conference call may be initiated by having the participants dial-in to an identified bridge number. If desired, the scheduler can be adapted to contact the conference call participants, at the time of the call or otherwise, with reminders concerning the call, e.g., by phone or e-mail.

According to another aspect of the present invention, a computer network structure is utilized to allow for automatic scheduling for bridge resources for conference calls. The corresponding method involves providing a network structure usable for conveying communications between a scheduler at a server network node and at least three client nodes associated with at least three prospective conference call participants, and using the network structure to convey communications between the server node of the scheduler and each of the client nodes of the prospective conference call participants regarding a conference call. These communications are utilized to arrange the conference call relative to the telecommunication bridge resources. The communications may include a scheduling request from a first client node of a first prospective conference call participant to the server node of the scheduler requesting access to the telecommunications bridge resources for the conference call. The communications may further include transmitting information from the server node of the scheduler to each of the client nodes of the prospective conference call participants regarding information for establishing access to the bridging resources, e.g., a 1-800 number for the conference call.

According to a further aspect of the present invention, a method is provided for operating a control system of telecommunications bridging resources in response to inputs from a scheduler. The method includes the steps of providing a number of bridges for bridging conference calls, providing a control system for controlling access to the bridges, and operating the control system to provide access to the bridges in response to scheduling information from a scheduler where the scheduler is accessible by each of a number of prospective conference call participants via a computer network in order to schedule or confirm a conference call. Conference calls may be confirmed, or a participant may obtain information regarding a scheduled conference call, by searching a conference call database and pulling up related screens. Such searching may be conducted based on call time, participants, organizer or chair person, or other data fields. The step of operating may involve updating a scheduling database based on the scheduling information and/or establishing connections between the conference call participant and at least one of the bridges based on the scheduling information. The scheduler can also be linked to a billing system to transmit information regarding billing for conference calls. For example, the scheduler may direct that the conference call be billed to the arranging party, or to a particular organization, company, or unit within a company. Alternatively, the scheduler may assign a 1-900 number for accessing the conference call or levy a fee for obtaining a password to participate in a call, thereby allowing for charges directly to the conference call participants.

BRIEF DESCRIPTION OF THE DRAWINGS

For a more complete understanding of the present invention and further advantages thereof, reference is now made to the following detailed description taken in conjunction with the drawings in which.

DETAILED DESCRIPTION

In the following description, the invention is set forth in the context of a bridge scheduler accessible via a public computer network such as the Internet. In the particular application set forth below, the scheduler is used to access a pool of conference call bridges operated by a given company. Access to the bridges may be limited to the company or may be provided to clients on a subscription or other basis. Although the invention is therefore set forth with regard to a particular application, it will be appreciated that various aspects of the invention are more broadly applicable to administration of conference call bridges or to administration of other resources such as scheduling conference rooms, AV equipment, etc.

Figure 1:
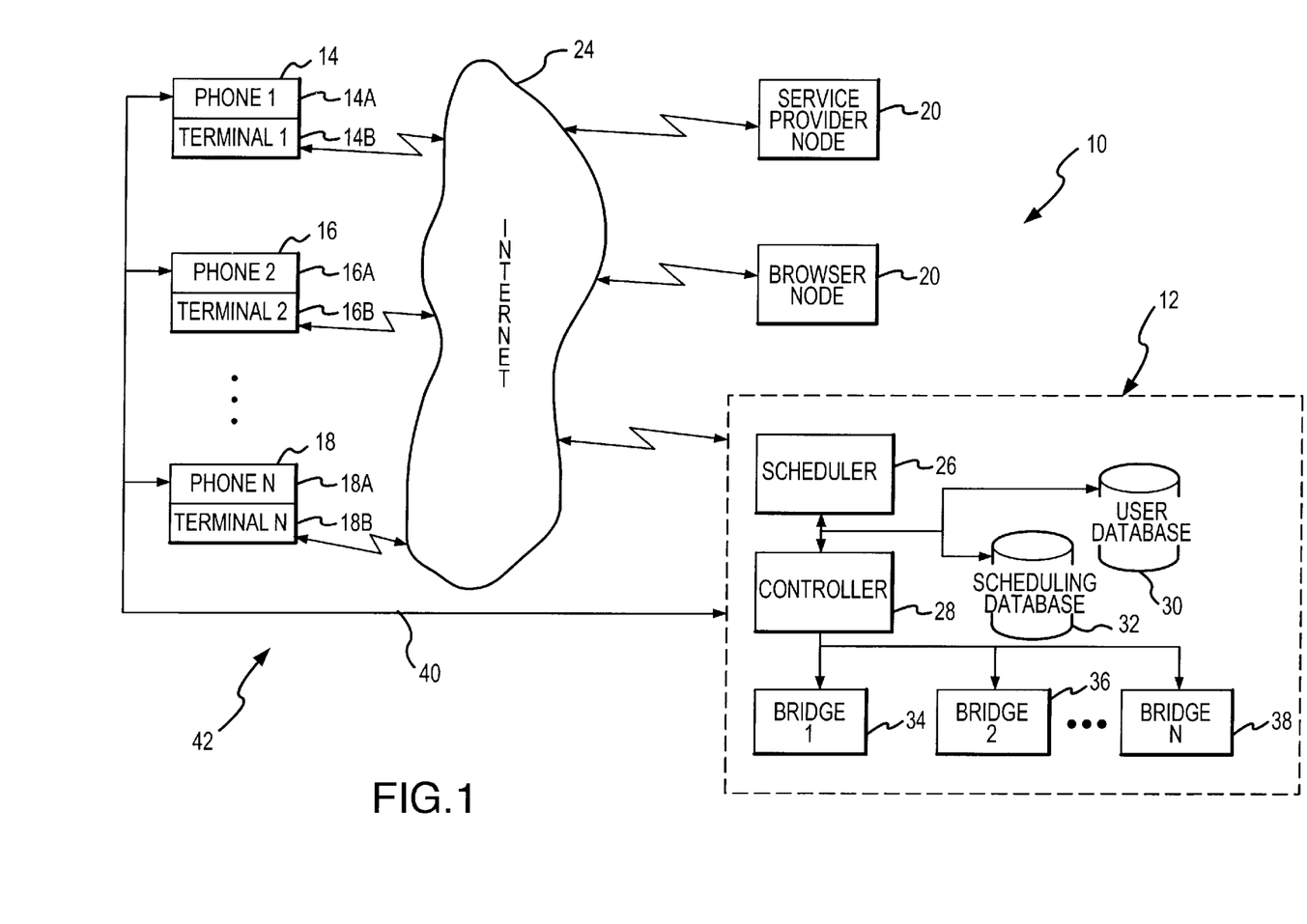
FIG. 1 is a schematic diagram illustrating a conference call bridge scheduling system in accordance with the present invention.

Referring to FIG. 1, the scheduling system is generally identified by the reference numeral 10. Generally, the scheduling system 10 includes a bridge administrator 12 that is interfaced with a plurality of nodes 14, 16 and 18 via a private or public computer network such as the Internet 24. In particular, each of the nodes 14, 16 or 18 may establish communications with the bridge administrator 12 by way of contacting any of various service provider nodes 20 and browser nodes 22. Although only one service provider node 20 and one browser node 22 are illustrated, it will be appreciated that different service providers and browsers may be used by the various users.

In the illustrated embodiment, each of the nodes 14, 16 and 18 is shown as including both a phone 14A, 16A and 18A and a computer 14B, 16B and 18B. By way of example, the nodes 14, 16 and 18 may be thought of as an office or employee work space including a phone and computer, or a computer with a telephone facility. In addition, the bridge administrator 12 is shown as including a scheduler 26, a controller 28 for controlling connections to the bridge resources, a user database 30, a scheduling database 32, and a number of bridges 34, 36 and 38. It will be appreciated, however, that various components of the bridge administrator 12 may be located at different nodes relative to the Internet 24. For example, the scheduler 26 may communicate with the controller 28 via the Internet 24 and either or both of the scheduler 26 and controller 28 may communicate with either or both of the databases 30 and 32 across the Internet 24. In addition, although the present invention allows for automation of bridge scheduling, an operator may still be used for certain functions such as establishing conference call connections. It will therefore be appreciated that the illustrated architecture is provided only for purposes of illustration.

As shown in FIG. 1, the computers 14B, 16B and 18B can communicate with the bridge administrator 12 or at least the scheduler 26, via the Internet using network structure including a service provider at a service provide node 20 and a browser service associated with a browser node 22. Additionally, the phones 14A, 16A and 18A can communicate with the bridge administrator 12, or at least the controller 28, via a telecommunications network connections, generally identified by arrow 40 in order to set up and conduct the conference call. As will be better understood upon consideration of the description below, the computer network including computers 14B, 16B and 18B, Internet 24, service provider node 20, browser node 22 and scheduler 26 can thus be used to schedule a conference call. The subsequent conference call is conducted using a telecommunications network 42 including phones 14A, 16A and 18A, connections 40, controller 28, and bridges 34, 36 and 38.

Figure 2:
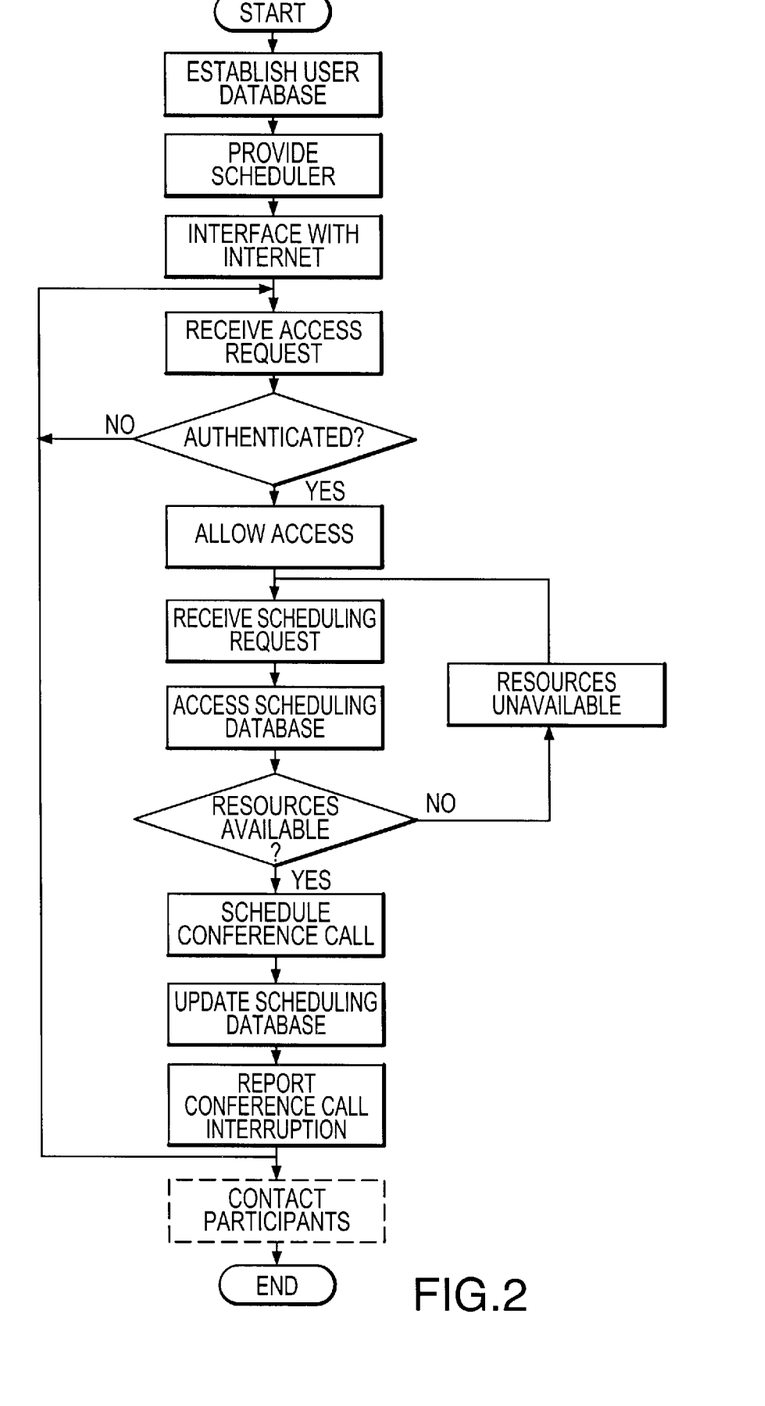
FIG. 2 is a flowchart illustrating operation of the scheduling system of FIG. 1.

FIG. 2 is a flowchart illustrating operation of the scheduling system 10. In order to control access to the scheduling system via the Internet, it is desirable to identify the users who will be allowed to schedule conference calls or make changes to scheduled conference calls. Accordingly, operation of the system 10, as illustrated in FIG. 2, includes establishing (50) a user database of authorized users. The database may include for example, all of the employees of a company, of a particular group, or the list of subscribers to a conference call feature provided by the company. In this regard, authorized users may be issued a password, either to access the scheduler or on a conference call by conference call basis. In the latter case, users may be charged a certain amount to obtain a password as a method for generating revenues. Operation of the scheduling system also includes providing (52) a scheduler and interfacing (54) the scheduler with the Internet. In this regard, the scheduler is preferably a program that runs on a server. The server is interfaced with the Internet by obtaining a URL and activating the server website.

Once the scheduler is activated, the scheduler receives (56) access requests from network users who desire to schedule a conference call. For example, the user may initiate the process by opening a home page of the scheduler's server node. At the home page, the user may be prompted to enter identification information such as a password or numeric code. In this manner, the user can be authenticated (58) as an authorized user of the scheduler. Alternatively, particular user nodes or user node equipment may be designated as authorized nodes for accessing the scheduler. In the latter case, the authorized node equipment may be identified by the scheduler without requiring separate identification information.

If the access request is authenticated, either by identifying the user node or by comparing a password or other identification information to a user database, then the user is allowed (60) to access the scheduling functions of the scheduler. Otherwise, the user is notified that access is denied and the server awaits further access requests. Where the user is allowed to access the scheduling functions, the user will then be prompted, on a further page, to enter a scheduling request. The scheduling request may include for example, the date and time of the requested conference call, the number and identity of participants, the anticipated duration of the conference call and any other pertinent information. To facilitate entry of a list of participants, the scheduler may be programmed to receive participant information from other applications such as electronic address books. For example, a chairperson may have a group of co-workers that regularly participate in conference calls. Such a group may be defined in an electronic address book and such information can be electronically transferred to the scheduler to populate the relevant call participant fields. Once these prompts have been fully responded to by the user, the user enters the information and the resulting scheduling request is received (62) by the scheduler.

In response to the received scheduling request, the scheduler accesses (64) a database of scheduling information to determine whether resources are available (66). In this regard, the scheduler determines what resources are necessary (based on, for example, the number of participants, the time of the call and the duration of the call) and compares this information to the current state of the database to determine whether appropriate resources are available. If the resources are not available, the scheduler may transmit (68) a resources unavailable message to the user and return the user to the scheduling request prompts. Alternatively, the scheduler may propose an alternative conference schedule based on available resources.

If the resources are available, then the scheduler schedules (70) the conference call by reserving the available resources, updates (72) the scheduling database to reflect the unavailable status of the reserved resources at the time of the conference call and reports (74) the conference call information. The conference call information, may include the scheduling information (time, date, duration etc.) as well as information for accessing the bridge resources. For example, the access information may include a 1-800 number for the conference call participants to dial at the arranged time of the conference call in order to access the bridge or bridges designated for that conference call. Alternatively, a 1-900 number may be assigned as a way of generating carrier revenues in return for providing call bridging services. The call information may be reported to the user responsible for arranging the conference call or to all of the participants identified in the scheduling request. In one implementation, each conference call participant is assigned an identification code to access the scheduler and each participant can then directly schedule/confirm his or her participation. In response, the conference call information is reported directly to each participant. The scheduling process is thus completed and a scheduler is made available for processing further scheduling requests. Optionally, the scheduler may be programmed to contact (76) all of the conference call participants at or near the time of the scheduled conference call. For example, the participants may be contacted via e-mail to provide a reminder of the conference call. Alternatively, the scheduler may be operated in conjunction with a bridge controller to automatically dial the phone numbers of each of the participants at the time of the conference call so as to patch the participants to the designated bridge.

The scheduler may also be programmed to transmit billing information to a billing application. For example, the billing information may indicate an appropriate billing rate value based on the time and duration (or reserved bridge time without regard to the actual call duration) as well as the participant, organization, company unit, or the like to be billed for the call.

Additionally, the scheduler may be programmed to allow authorized users to search a call schedule database in order to find scheduling information of interest. In this regard, any appropriate call fields may be searchable. For example, a user may wish to verify the time, access phone number or other information regarding an upcoming conference call. The user may only recall, for example, who was the arranging participant or the date of the call. The search tools can be designed, in conventional fashion, to locate appropriate call information relative to any such fields of information. If desired, different levels of access may be provided for security purposes, e.g., only a chairperson may be allowed to access to certain sensitive data, or only certain persons responsible for overseeing bridge use in a given unit of a company may be allowed access to all conference call data for that unit. The scheduler may also be programmed to delete from the database certain "one time only" conference calls at a designated time after the time scheduled for the call as a matter of database management.

Figure 3:
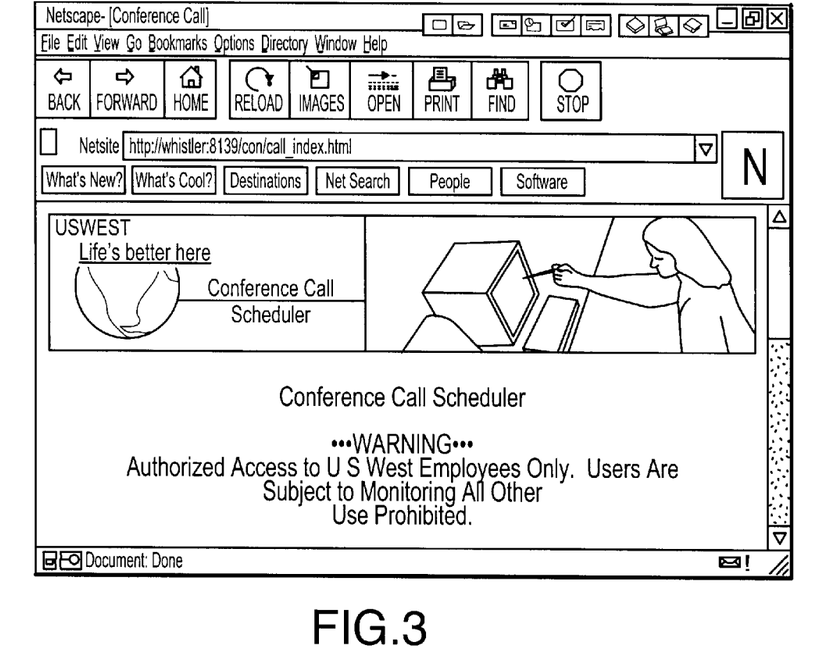
FIGS. 3–12 show a number of windows utilized in a preferred implementation of the present invention.
Figure 4:
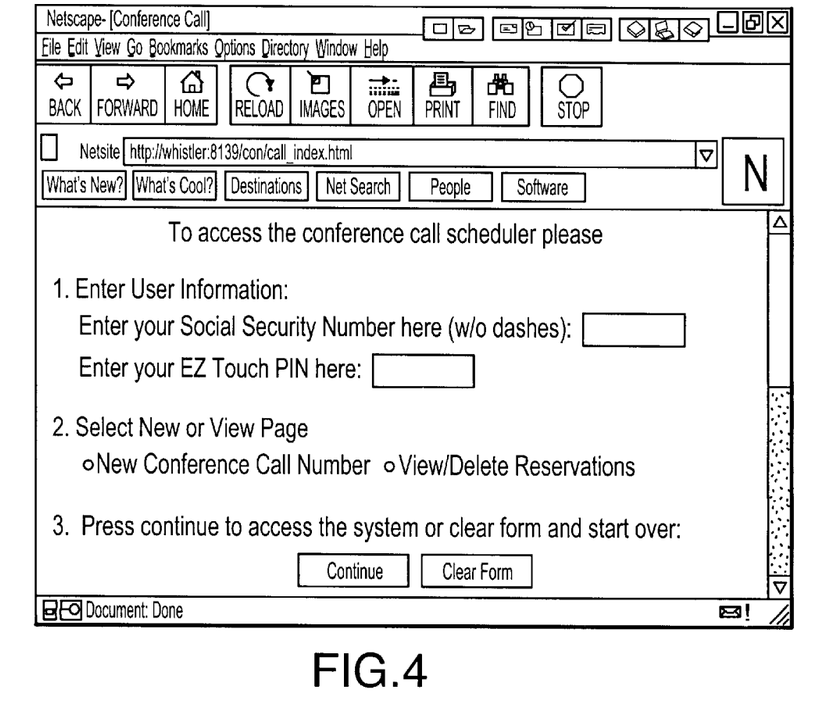

FIGS. 3–12 illustrate various web pages associated with a specific implementation of the conference call scheduler. As will be noted from the figures, in the illustrated implementation, the scheduler is accessed via the netscape navigator browser/browser site and allows access only by employees of a particular company (US West). FIG. 3 illustrates the home page of the scheduler and provides authorization and other information. FIG. 4 illustrates an accessed request page. In this case, the user is authenticated by receiving a social security number and security PIN for accessing the scheduler. It will be appreciated that this information can be verified relative to a user database in order to forward unauthorized access. The user can also select from two scheduling functions, namely; scheduling a new conference call number or viewing/deleting reservations. The user is then prompted to continue in order to submit the access request.

Figure 5:
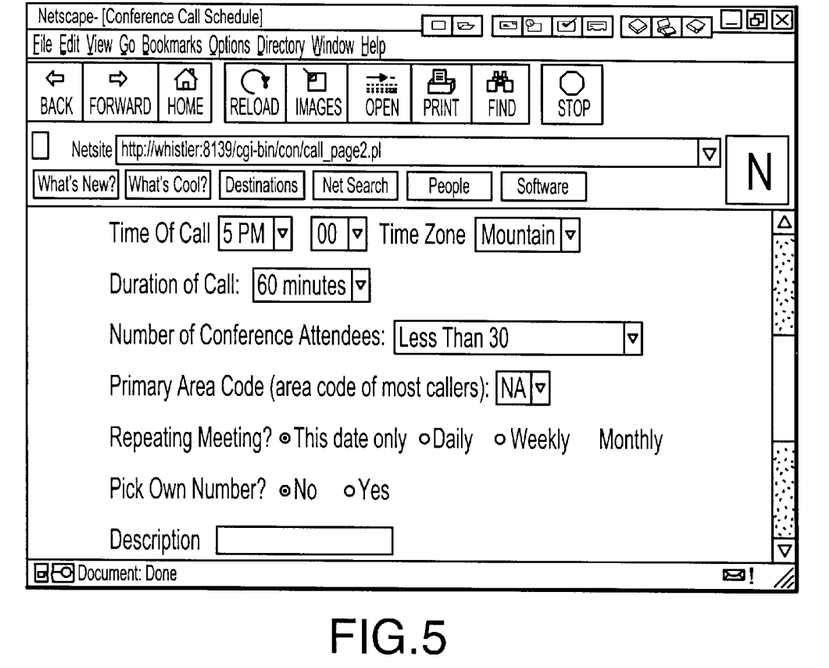

FIG. 5 shows a scheduling request page. As will be noted, the user is prompted to enter the time, date, duration, number of participants and other information regarding a conference call. In the example illustrated in FIG. 5, the user is electing a one-time only conference call.

Figure 6:
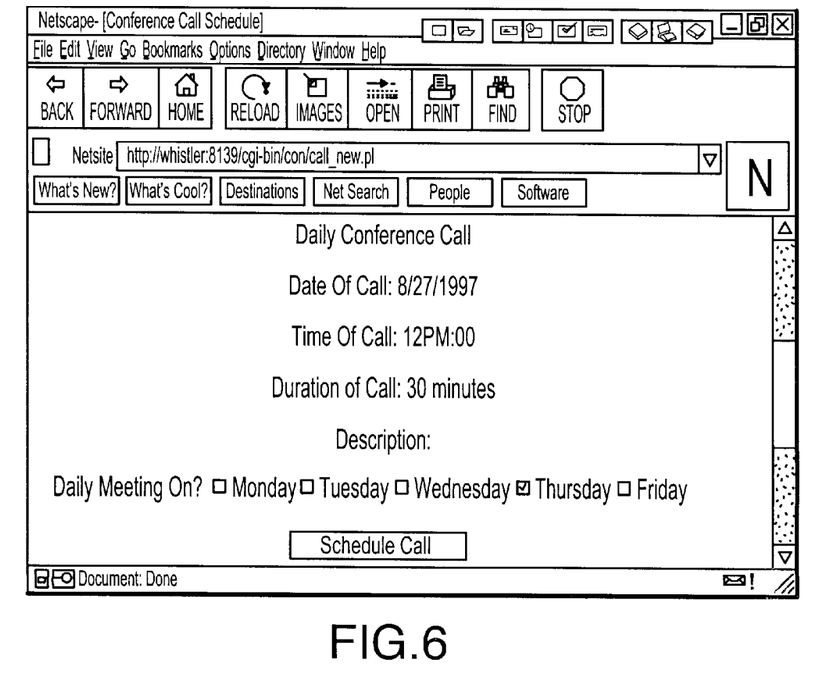

FIG. 6 illustrates a call report page. This report page may be transmitted to the call arranging user only or, if sufficient information is available, may be transmitted to all conference call participants. In this case, the report reflects a reservation for a thirty minute conference call on Jun. 30, 1998.

Figure 7:
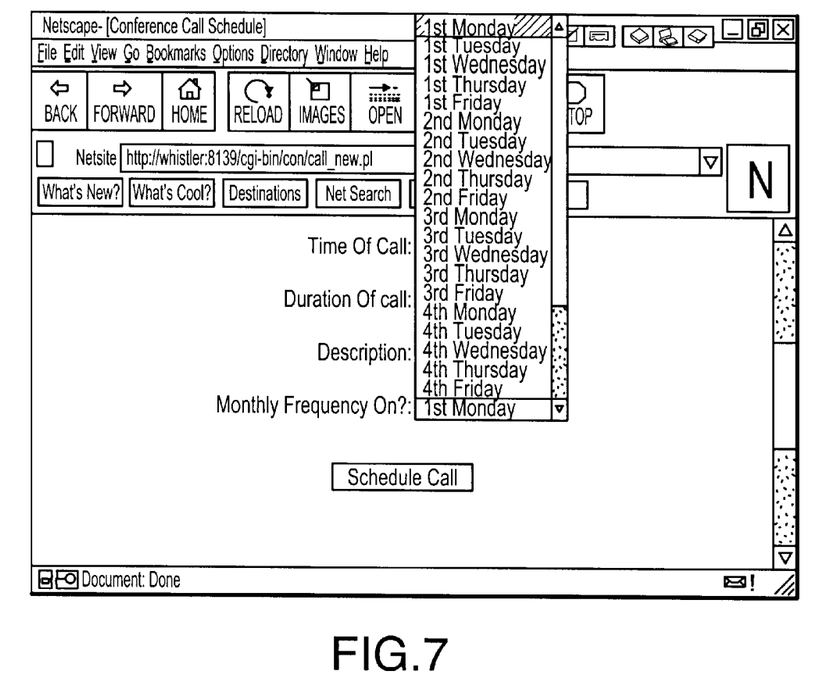

FIG. 7 shows the use of pull down or pull up screens in order to facilitate further functionality. In this case, the screen allows for convenient scheduling of recurring conference calls, for example, conference calls regularly scheduled for the first Monday of each month. The desired function is selected by highlighting the function and then clicking on the scheduled call button.

Figure 8:
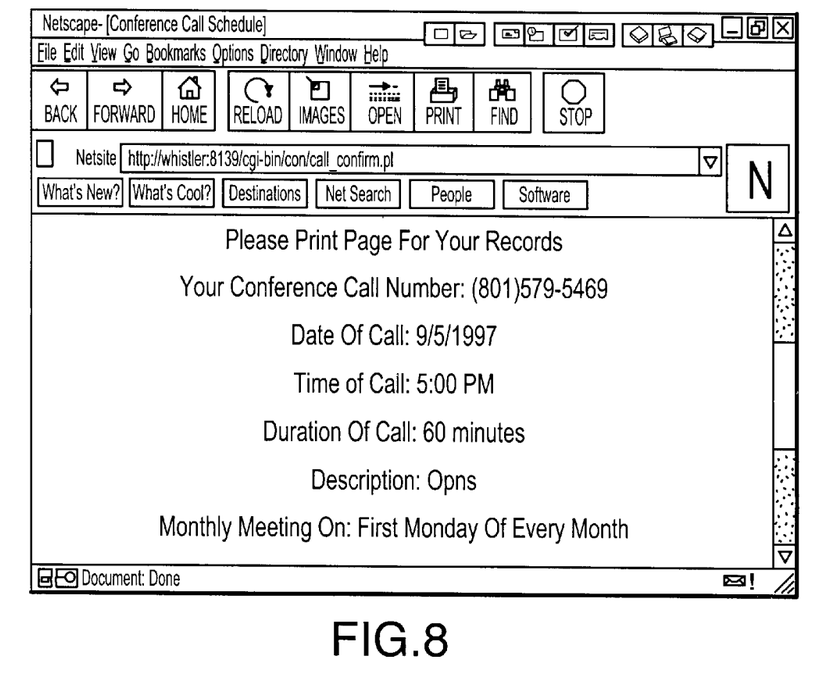

FIG. 8 shows a corresponding conference call report. In this case, the scheduler transmits to the user information including the conference call number, the date of the call, the time of the call, the duration of the call and reflects the monthly nature of the call. Any other pertinent information may be entered in the description field.

Figure 9:
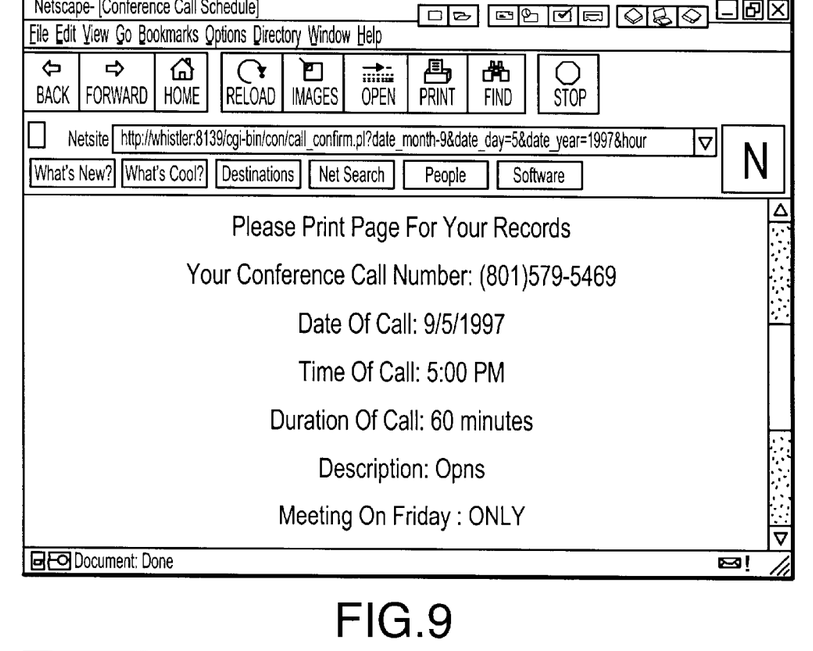

FIG. 9 shows a similar report for a one-time only meeting.

Figure 10:
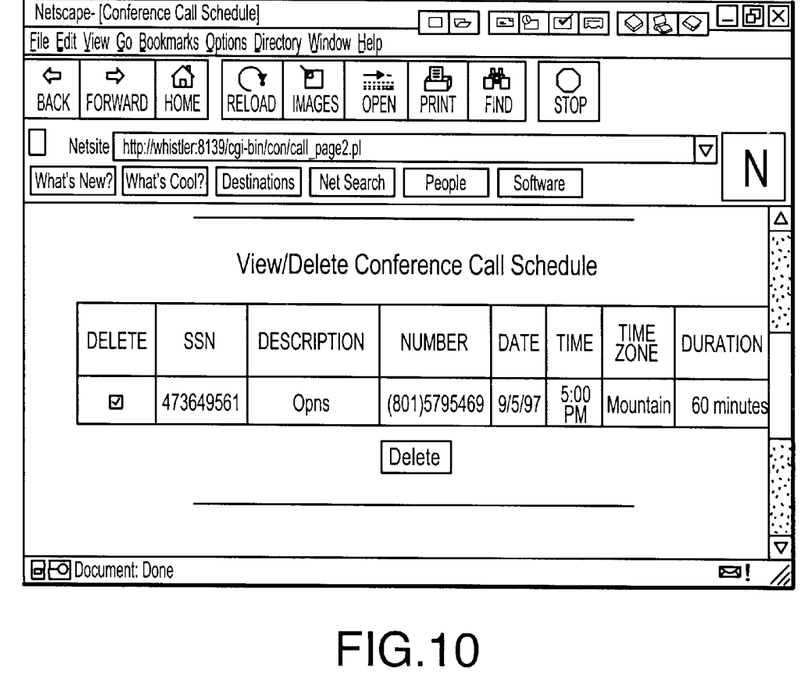

FIG. 10 illustrates a second function of the call scheduler, namely, viewing and deleting previously scheduled conference calls. As previously noted, the user has the option of scheduling a new call or viewing/deleting/editing a previously scheduled conference call. For example, the user may access this information merely to confirm an upcoming conference call. Alternatively, the user may wish to reschedule or cancel a previously arranged call. FIG. 10 shows a screen that may appear in response to selecting the view/delete option. As shown in FIG. 10, the user has elected to delete a previously scheduled call by marking the appropriate box in the delete column. This process can be completed by clicking on the delete button at the bottom of the window.

Figure 11:
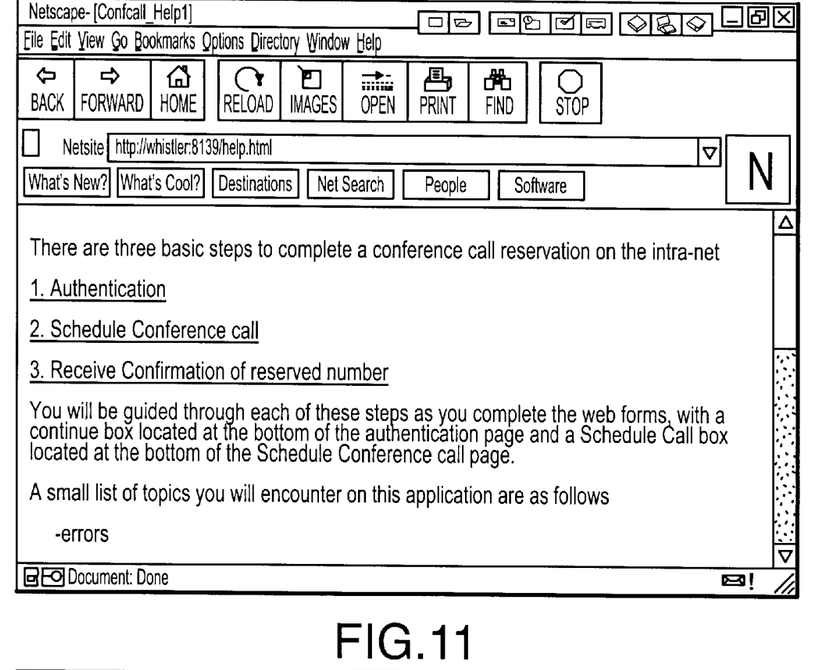
Figure 12:
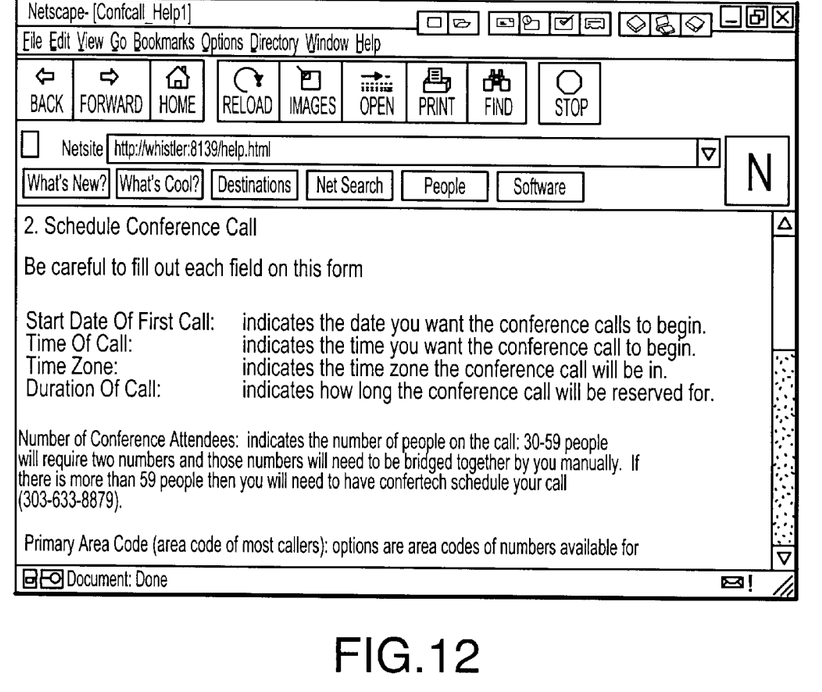

FIGS. 11 and 12 show examples of help screens that may be provided in connection with the scheduler. In particular, FIG. 11 provides an overview of the help topics including authentication, schedule conference call and receive confirmation of reserve number. FIG. 12 illustrates the second topic—schedule conference call. As will be noted, the help screens provide detailed assistance to the user so that the scheduler can be used with little or no formal training.

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed is:

1. A method for use in administering usage of shared resources, comprising the steps of:

providing a scheduler for use in scheduling access to said shared resources, said scheduler employs and provides access to availability information regarding the shared resource, wherein said availability information comprises a schedule for future use for said shared resources;

receiving an access request via said public network from a first user associated with a first node of said network;

authenticating said access request by verifying authorization information relative to said first use;

selectively allowing said first user access to said scheduler via said public network based on said step of authenticating;

receiving a scheduling request via said public network from said first user regarding scheduling for said shared resources;

using said scheduler to access a scheduling database and process said scheduling request, wherein the step of processing may comprises determining that the shared resources are available at selected future time, scheduling the resources for the selected future time, and updating the database accordingly; and outputting scheduling information regarding said shared resources to said first user at said first node based on said processed scheduling request.

2. A method as set forth in claim 1, wherein said shared resources comprise telecommunications bridge resources and said step of providing a scheduler includes providing access to scheduling information for scheduling conference calls.

3. A method as set forth in claim 1, wherein said step providing comprises loading a scheduling program onto a server of said public computer network.

4. A method as set forth in claim 1, wherein said step of interfacing comprises establishing a location for accessing said scheduler via said public computer network.

5. A method as set forth in claim 1, wherein said step of receiving comprises obtaining identification information regarding said first user and said step of authenticating comprises comparing said identification information to a database of authorization information for users that are authorized to access said scheduler.

6. A method as set forth in claim 2, wherein said step of receiving a scheduling request comprises one of receiving a request to schedule a conference and receiving a request to change a scheduled conference call.

7. A method as set forth in claim 2, wherein said step of using said scheduler comprises storing availability information regarding a bridge and using said stored availability information to schedule said conference call.

8. A method as set forth in claim 2, wherein said step of using said scheduler comprises storing availability information regarding a plurality of bridges, using said availability information to select one of said bridges for said conference call and scheduling said conference call.

9. A method as set forth in claim 2, wherein said step of outputting scheduling information comprises outputting information regarding one of a time and a list of participants for said conference call.

10. A method as set forth in claim 2, wherein said step of outputting scheduling information comprises outputting information for establishing a connection to said bridge resources for said conference call.

11. A method as set forth in claim 2, further comprising the step of establishing communication between said scheduler and a controller associated with said bridge resources so as to transmit scheduling information therebetween.

12. A method for use in administering usage of telecommunications bridge resources, comprising the steps of:

providing a network structure usable for conveying communications between a scheduler at a server network node, wherein the scheduler is configured to provide access to availability information for said bridge resources and to schedule future use for said bridge resources and at least three client nodes associated with at least three prospective conference call participants;

first conveying, using said network structure, first communications regarding a future conference between said server node of said scheduler and a first of said client nodes of a paid prospective conference call participants;

second conveying, using said network structure, second communications regarding said future conference call between said server node of said scheduler and a second of said client nodes of a second of said prospective conference call participants;

third conveying, using said network structure, third communications regarding said future conference between said server node and a third of said client nodes of a third of said prospective conference call participants; and wherein said first, second and third communications are utilized to arrange said conference call relative to said telecommunications bridge resources.

13. A method as set forth in claim 12, wherein said step of first conveying comprises conveying a scheduling request from said first client node of said first prospective conference call participant to said server node of scheduler, said scheduling requesting access to said telecommunications bridge resources for said conference call.

14. A method as set forth in claim 12, wherein each of said steps of first, second and third conveying comprises transmitting information for establishing access to said telecommunications bridge resources from said server node of said scheduler to a corresponding one of said client nodes.

15. A method as set forth in claim 12, wherein said step of providing comprises establishing a service provider node for transmitting communications between said server network node and said client nodes.

* * * * *